Oct. 19, 1971  SHIGEJI ISHIKAWA ET AL  3,613,447
CALORIMETER FOR FLOWING FLUIDS

Filed July 24, 1969  2 Sheets-Sheet 1

INVENTOR.
SHIGEJI ISHIKAWA
BY YUJI TERAYAMA
MASUHIRO WADA

Michael S. Studer
Attorney

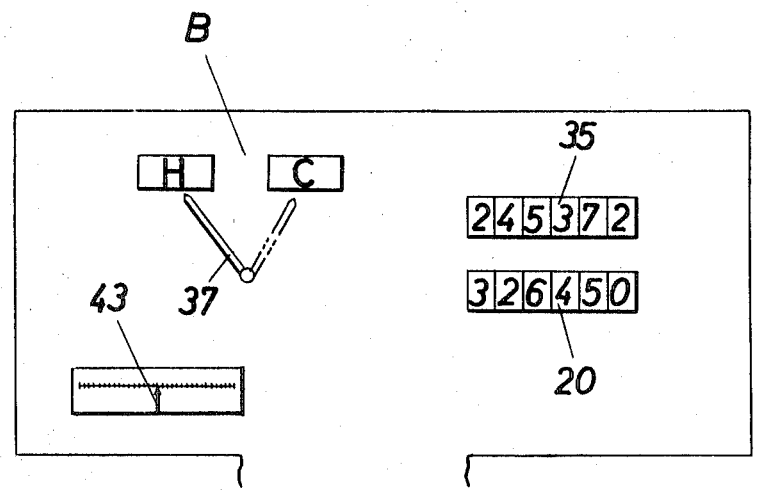
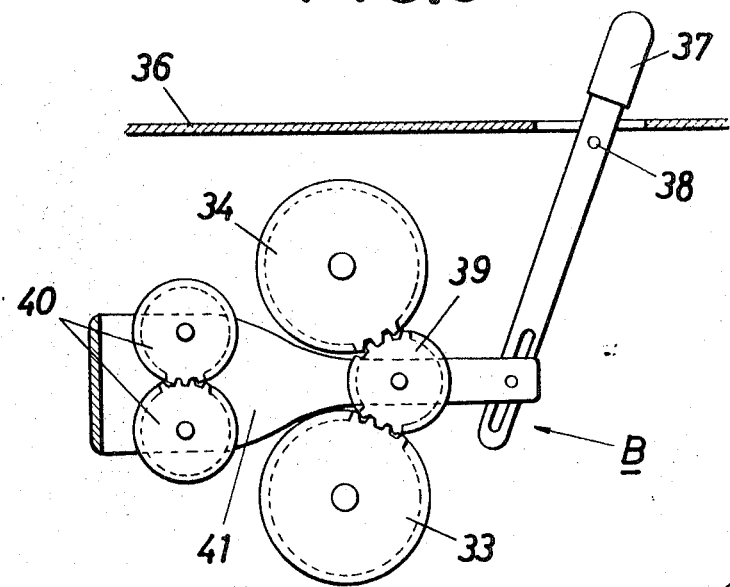

United States Patent Office 3,613,447
Patented Oct. 19, 1971

3,613,447
CALORIMETER FOR FLOWING FLUIDS
Shigeji Ishikawa, Yuji Terayama, and Masuhiro Wada, Tokyo, Japan, assignors to Oval Kiki Kogyo Kabushiki Kaisha, Tokyo, Japan
Filed July 24, 1969, Ser. No. 844,422
Claims priority, application Japan, July 31, 1968, 43/65,428; May 27, 1969, 44/48,370
Int. Cl. G01k 17/06
U.S. Cl. 73—193 R   6 Claims

ABSTRACT OF THE DISCLOSURE

Apparatus for calculating and integrating calories of flowing fluids, wherein it is possible to calibrate and integrate flow rate and calories of flowing fluids and to indicate difference in temperature of the fluids at points upstream and downstream of a thermal load by directly detecting the flow rate of the fluids, calculating unintermittently and in relation to the detected flow rate the removal of heat from the fluids through detecting mechanical variations proportional to said difference of temperature and directly transferring said variations onto an indicating means, and wherein it is also possible to keep an output member constantly rotating in a fixed direction by changing a change-over mechanism provided in the apparatus, so as to make digital wheels rotate in a fixed direction to integrate calories either used for air-cooling or heating always in a positive number without the replacement of temperature detecting means and consequently to indicate whether the system is under air-cooling or heating.

---

Figure 1:
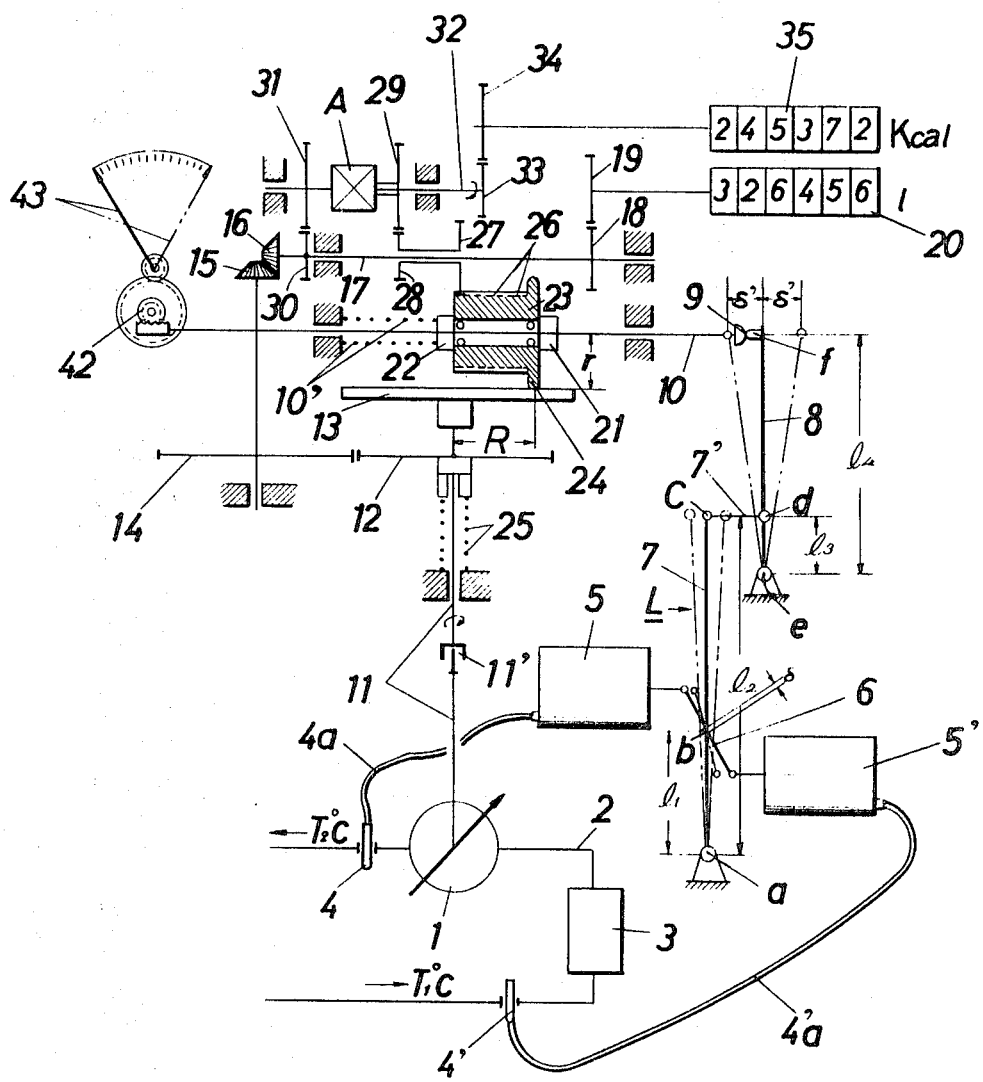

This invention relates to an apparatus for calculating and integrating calories of flowing fluid.

It is an object of the present invention to provide an apparatus for calculating and integrating calories of flowing fluid in which the removal of heat from the flowing fluid by a thermal load in the path of flow is calculated and calibrated as an integrating value and an integrating flow rate of the fluid and change in fluid temperature before and after the thermal load are also indicated.

It is another object of the present invention to provide an apparatus for calculating and integrating calories of flowing fluid, in which the removal of heat within the flowing fluid is integrated and calibrated continuously by a single integrating mechanism and through the change of a switch, independently within heat within the flowing fluid is utilized for air-cooling or heating.

It is another object of the present invention to provide an apparatus for calculating and integrating calories of flowing fluid, in which a difference in temperature between upstream and downstream points of a thermal load is detected as a mechanical variation by a pair of bellows each connected to the upstream or downstream points and in which the mechanical variation detected thereby is amplified by a leverage.

It is another object of the present invention to provide an apparatus for calculating and integrating calories of flowing fluid, in which the flow rate of fluid flowing in pipes and having thermal load therein is detected as the number of rotations of a rotary friction disk on the surface of which a rotatable roller slidably engages, said rotatable roller changing its position where it engages the rotary friction disk, in the radial direction of the disk through a distance corresponding to a mechanical variation given thereto in accordance with a difference in temperature between points upstream and downstream of a thermal load in the flowing fluid and consequently said roller changing its rotary revolutions, whereby the number of rotations of the roller and that of the frictional disk each leads to a formal expression for the continuous integration of calories and flow rate through differential gearing.

It is a still other object of the present invention to provide apparatus for calculating and integrating calories of flowing fluid, in which the removal of heat within the flowing fluid in the path of flow having a thermal load therein is calculated and calibrated, through a transfer device which can change the system for air-cooling or heating, always in positive numbers regardless whether difference in the temperature between points upstream and downstream of a thermal load is positive or negative.

In view of the above objects and other objects which shall be described hereinafter, the present invention is explained in detail hereinunder with reference to the accompanying drawing illustrating a preferred embodiment of the present invention.

In the accompanying drawing:

FIG. 1 is an explanatory view of an embodiment of the calorimeter for flowing fluids according to the present invention, showing the whole structure thereof, FIG. 2 is a front view showing a front panel thereof, and FIG. 3 is a side view showing a change-over mechanism connected to the front panel illustrated in FIG. 2.

A weir of fixed constriction for measuring the flow of fluids such as a flow meter 1 is placed in the path of flow 2 downstream of a thermal load 3 provided in the path. The temperature of the fluid passing through fixed upstream and downstream points having the thermal load 3 and flow meter 1 therebetween is detected by temperature detecting means 4 and 4' each placed in the path of flow 2 at the above fixed upstream and downstream points. The temperature detecting means 4 and 4' are respectively connected to bellows 5 and 5' by capillary tubes 4a and 4a' for transferring the values detected by the means 4 and 4' to the bellows. Expansion or contraction of gases or fluids enclosed in the bellows 5 and 5' translates the temperature detected by the means 4 and 4' into mechanical movement in relation to the variation of temperature. A difference of the temperature ΔT between the upstream and downstream points is calibrated by the motion of a differential link 6 connecting the mechanical movements of bellows 5 and 5'. The motion of said differential link 6 is amplified by a lever 7 connected to the link 6 and pivotally fixed at its one end and a lever 8 connected to the lever 7 and pivotally fixed at its bottom end. A contact 9 is adjustably mounted on the end of the lever 8 through a means which prevents an overload exerted on the lever 8 from being transferred to the contact, and the latter engages a horizontally slidable shaft 10.

The leverage L consisting of, as illustrated in FIG. 1, the differential link 6, the lever 7 with a length of $l_2$ which is tiltable about a pivot $a$ and connected to the link 6 at a point $b$ with a distance $l_1$ from the pivot $a$, and the lever 8 with a distance of $l_4$ which is tiltable about a pivot $e$ and connected to the link 7 by a connecting rod 7' at a point $d$ with a distance $l_3$ from the pivot $e$ and the contact 9, can amplify a minute motion $\delta$ of the differential link to an enlarged motion $\delta'$ which works on the contact 9 mounted on the lever 8 at its forward end $f$.

The rotary velocity of the output of the meter 1 is transmitted to a driving gear 12 and a rotary friction disk 13 by an output shaft 11 having a joint 11'. The driving gear 12 further transmits the rotary output velocity to a rotary shaft for integrating the flow of fluid 17 through a gear 14 which is in mesh with the driving gear 12 and a pair of bevel gears 15, 16 one of which is coaxially connected to the wheel 14 and another of which is coaxially mounted on a rotary shaft 17. This rotary shaft 17 drives a digital drum 20 through a train of gears 18 and 19, resulting in indicating an integration of the flow of fluid on the drum in a formal expression such as in litre.

On the aforementioned horizontally slidable shaft 10, a roller 22 is rotatably mounted between a pair of set rings 21 and 23 which are fixedly mounted on the shaft 10 with a predetermined distance therebetween. An annular flange 24 is provided on one circumferential edge of said roller 23 and the flange 24 engages the surface of the rotary friction disk 13 and is movable in the radial direction of said disk. The engagement between the flange 24 of the roller 23 and friction disk 13 is assured by a spring 25 which presses the disk 13 toward the roller 23. The roller 23 has teeth 26 on its circumferential outer wall except the flange 24. A gear 27 which is in mesh with the teeth 26, is slidably mounted on the rotary shaft 17 and has a gear 28 coaxially fixed thereto. The gear 28 is in mesh with the gear 29, the rotary motion of which is one of the inputs given to a differential gearing A. In the above construction, the flange 24 of roller 23 slides, being pushed by the horizontally slidable shaft 10 which is moved by the contact 9 in accordance with a difference in temperature, on the surface of the friction disk 13 in radial direction of the latter against counteracting force applied to the roller by a spring 10′ and rotates about its axis while continuously changing its rotary velocity. The gear 27 rotates also, being in mesh with the teeth 26 of the roller 23. Since a gear 31 which is in mesh with a gear 30 mounted on the rotary shaft 17 applies another input to the differential gearing A besides the one applied to the gearing by the gear 29, the output shaft 32 is rotated at a rotary speed corresponding to the difference between the rotary speeds of the input gears 29 and 31 and rotates an integrating calory indicating digital drum 35 through transmission gears 33 and 34.

When desired, a change-over mechanism B may be provided between the gear 33 of output shaft 32 of the differential gearing A and the gear 34 meshed with the gear 33, so that the system can integrate calories when flowing fluids are utilized either for air-cooling or for heating.

Said change-over mechanism B includes, as illustrated in FIG. 3 for example, an operating lever 37 the free end of which projects outwardly from a casing box 36 and which is tiltable to the right or left about a pivot 38, a supporting member 41 on which a gear 39 having teeth exactly corresponding to those of the gears 34 and 33, and a pair of gears 40, engaged with each other and having teeth corresponding to those of the gears 34 and 33, are mounted. When the operating lever 37 is tilted to the right as shown in FIG. 3, viz., to the air-cooling position as shown in FIG. 2 by dotted lines, the gear 39 comes in mesh with both gears 33 and 34 which are mounted with a fixed distance therebetween. When the lever 37 is tilted to the opposite side, viz., to the heating position as shown in FIG. 3 by a solid line, the pair of gears 40 come in mesh with the gears 33 and 34. Thus, the change-over mechanism B having the above constructions prevent the gear 34 from rotating in a reverse direction even when the system is changed from heating to air-cooling operation.

The difference in temperature of fluids at upstream and downstream points can be observed by an indicator 43 connected through a mechanical amplifier 42 such as a rack and pinion, to the horizontally slidable shaft 10 at an end opposite to its other end which engages the contact 9.

The working principle of integrating calories in the present invention system having the above constructions is explained hereinunder.

The difference in temperature $\Delta T$ of fluids having the temperature of $T_1°$ C. and $T_2°$ C. at points upstream and downstream of a thermal load is obtainable from the following equation.

$$\Delta T = T_1 - T_2$$

Said difference of temperature $\Delta T$ is detected as the mechanical variation $\delta$ by the differential link 6 consisting of the temperature detecting means 4 and 4′ and the bellows 5 and 5′ and amplified by the levers 7 and 8 as much as $l_2/l_1 \times l_4/l_3$ to give the amplified variation $\delta'$ to the contact 9 which in its turn pushes the shaft horizontally a distance corresponding to the variation $\delta'$. Subsequently, the roller 23 slides on the friction disk 13 and their relative velocity becomes $R/r$, in which $r$ represents a radius of the roller 23 and R a distance from the center of the disk 13 to the flange 24 which engages the disk. The number of input rotations $N\Delta T$ given to the differential gearing A at the right side in FIG. 1 is given by:

$$N\Delta T = Nu \times R/r \times Z_{26}/Z_{27} \times Z_{28}/Z_{29} \qquad (I)$$

Where $Nu$ represents the flow integrating rotary number of the shaft 11 and $Z_{26}$, $Z_{27}$, $Z_{29}$ and $Z_{28}$ each the number of teeth of the gears 26, 27, 29 and 28.

If $Z_{26}/Z_{27} \times Z_{28}/Z_{29} = 1$; then $N\Delta T = Nu \times R/r$.

On the other hand, the number of input rotations given to the differential gearing A at the left side in FIG. 1 is:

$$Nu \qquad (II)$$

Combining the Equations I and II one obtains the number of output rotations $Nc$ of the differential gearing A:

$$Nc = Nu - N\Delta T = Nu(1 - R/r \times Z_{26}/Z_{27} \times Z_{29}/Z_{28}) \qquad (III)$$

Consider, now:

$$Z_{26}/Z_{27} \times Z_{29}/Z_{28} = \alpha$$

Then, from the Equation III:

$$Nc = Nu(1 - R/r \times \alpha) \qquad (IV)$$

When considering the quantity of calory integrating constant, $K = Z_{33}/Z_{34}$ in which $Z_{33}$ and $Z_{34}$ each represents the number of teeth of gears 33 and 34; the calory integrating rotary number N is given by the equation:

$$N = K \times Nc$$

Then, from the Equation IV:

$$N = K \times Nu(1 - R/r \times \alpha) \qquad (V)$$

Since $(1 - R/r \times \alpha)$ is directly proportional to $\Delta T$, the Equation V reduces to the following Equation VI which satisfies the basic equation for integrating calories of flowing fluids.

$$Q = K \times V \times \Delta T$$

where $Q = N \times q$ Kcal ($q$ represents a calorific quantity indicated by a digital wheel per rotation)
$V = Nu \times Vl$ (V represents the flow rate indicated by a digital wheel per rotation)
$\Delta T = f(1 - R/r \times \alpha)C$ In the case $T_2 = T_1$, and accordingly $\Delta T = 0$, that is when no difference exists in the fluid at the different points ($T_2°$ C.) and ($T_1°$ C.), the contact 9 remains at the neutral position as shown in FIG. 1 and the position of the roller 23 on the disk 13 is adjusted so that the flange 24 of the roller 23 contacts the disc 13 along a circle with the radius R which is equal to radius $r$ of the flange. In this instance, because of $R/r = 1$ and $1 - R/r \times \alpha = 0$ in the Equation V, so that $N = 0$, which means that no calories are consumed by the load in the pipe system. Similarly, when $\alpha = r/R$, $N = 0$, i.e. the integration of calories rests. The indicator 43 is set so as to point to zero in this instance by adjusting the mechanical amplifier 42.

In case the object is to be heated in the pipe system by heat in the flowing fluid, the roller is moved inwardly by means of the link lever system which results in obtaining the value $N > 0$, namely, when $T_1 > T_2$, if $\alpha = 1$, then, $R/r < 1$; applying this data to Equation V, then $1 - R/r > 0$, therefore $N > 0$, and accordingly calculation is operated.

In case the object is to be cooled in the pipe system by the flowing cooling fluid, the roller is moved outwardly by means of the link lever system, which results in obtaining the value $N<0$, namely, when $T_1<T_2$, if $\alpha=1$, then, $R/r>1$; applying this data to Equation V, then $1-R/r<0$, therefore, $N<0$, and accordingly calculation is operated in the direction of reduction.

In this case, however, by turning the lever 37 to the opposite side, the switching mechanism B as shown in FIGS. 2 and 3, operates so as the wheels 33 and 34 which have been engaged with the wheel 39 come to engage with the pair of wheels 40, whereby the wheel 34 rotates in the direction to integrate calories in a positive number, making N greater than zero.

In the calorimeter according to the present invention, it is possible to calibrate and integrate flow and calories of flowing fluids and to indicate the difference of temperature of the fluids at upstream and downstream points of a thermal load by directly and mechanically detecting and transferring the flow rate of fluids, to continuously calculate and in relation to the detected flow rate the removal of heat from the fluids by the detection of mechanical variations proportioned to said difference of temperature and directly or indirectly transferring said variations onto an indicator and it is also possible to keep the calorific output rotation constantly in a fixed direction by changing the change-over mechanism, so as to make digital wheels rotate in a fixed direction to integrate calories used either for air-cooling or heating always in a positive number without the interchange of positions of the temperature detecting means 4 and 4' and consequently to indicate whether the system is under air-cooling or heating.

What is claimed is:

1. In combination with a heat exchanger system including conduit means defining a path for a heat conveying fluid therethrough and a heat exchanger in said conduit means so that fluid passing through the latter is heated or cooled by said heat exchanger, a calorimeter comprising flow meter means in said conduit means for measuring the rate of flow of the fluid passing through said conduit means; a pair of temperature sensing means for indicating the temperature of the fluid passing through said conduit means at fixed points respectively located upstream and downstream of said heat exchanger; a rotary friction disc having an axis and cooperating with said flow meter means to be rotated about said axis at a speed corresponding to the rate of flow of the fluid measured by said flow meter means; a roller rotatable about a second axis substantially normal to the axis of said friction disc and movable in radial direction of the latter while being in frictional contact therewith; means for moving said roller in said radial direction of said friction disc in dependence on and proportional to the temperature difference of the fluid at said fixed points; integrating means comprising differential gearing means having a pair of input shafts respectively connected to said friction disc and said roller to be respectively rotated at a speed proportional to the rotational speed of said friction disc and said roller, and an output shaft; and counter means connected to said output shaft for indicating the total amount of calories transferred between said fluid and said heat exchanger.

2. A calorimeter as defined in claim 1, wherein said means for radially moving said roller are arranged with respect to the axis of said friction disc in such a manner that when the temperature difference measured by said pair of temperature sensing means is zero, said roller will contact said friction disc along a circle having a radius equal to the radius of said roller so that the latter will be rotated at a rotational speed equal to that of said friction disc.

3. A calorimeter as defined in claim 2, and including a change-over means between said output shaft of said integrating means and said counter means for reversing rotation of said counter means so that the latter will indicate the total amount of calories transferred between said fluid and said heat exchanger regardless whether the fluid is cooled or heated in said heat exchanger.

4. A calorimeter as defined in claim 1, wherein said means for moving said roller in radial direction of said friction disc comprise amplifying lever means between said temperature sensing means and said roller.

5. A calorimeter as defined in claim 4, wherein said temperature sensing means comprise bellows.

6. A calorimeter as defined in claim 1, wherein said flow meter comprises a rotary member, said friction disc being connected to said rotary member for rotation therewith, and including means for indicating the total flow of fluid passing through said heat exchanger and comprising an additional counter and gear means connecting said friction disc to said additional counter for rotating the latter in accordance with the rotation of said friction disc.

References Cited

UNITED STATES PATENTS

| | | | |
|---|---|---|---|
| 1,088,280 | 2/1914 | Hottinger | 73—193 |
| 2,766,620 | 10/1956 | Koolman et al. | 73—193 |
| 3,318,150 | 5/1967 | Rose | 73—233 |
| 3,464,268 | 9/1969 | Wesp | 73—193 |

FOREIGN PATENTS 430,273  12/1965  Switzerland.

RICHARD C. QUEISSER, Primary Examiner

H. GOLDSTEIN, Assistant Examiner